(12) United States Patent
Wong

(10) Patent No.: US 12,345,837 B2
(45) Date of Patent: Jul. 1, 2025

(54) TIME-OF-FLIGHT SENSORS, METHODS, AND NON-TRANSITORY COMPUTER-READABLE MEDIA WITH ERROR CORRECTING CODE

(71) Applicant: Sony Semiconductor Solutions Corporation, Kanagawa (JP)

(72) Inventor: Ping Wah Wong, Sunnyvale, CA (US)

(73) Assignee: Sony Semiconductor Solutions Corporation, Kanagawa (JP)

(*) Notice: Subject to any disclaimer, the term of this patent is extended or adjusted under 35 U.S.C. 154(b) by 890 days.

(21) Appl. No.: 17/534,974

(22) Filed: Nov. 24, 2021

(65) Prior Publication Data
US 2023/0161016 A1     May 25, 2023

(51) Int. Cl.
| G01S 7/497 | (2006.01) |
| G01S 7/4865 | (2020.01) |
| G01S 17/894 | (2020.01) |
| H04N 25/705 | (2023.01) |

(52) U.S. Cl.
CPC ............ G01S 7/497 (2013.01); G01S 7/4865 (2013.01); G01S 17/894 (2020.01); H04N 25/705 (2023.01)

(58) Field of Classification Search
CPC ....... G01S 7/497; G01S 7/4865; G01S 17/894
See application file for complete search history.

(56) References Cited

U.S. PATENT DOCUMENTS

| 4,708,473 | A | 11/1987 | Metzdorff et al. |
| 4,854,698 | A | 8/1989 | Schmidt |
| 2018/0113200 | A1* | 4/2018 | Steinberg ............... G01S 17/10 |
| 2021/0183086 | A1 | 6/2021 | Wong |
| 2022/0365182 | A1 | 11/2022 | Nakamae et al. |
| 2024/0418841 | A1* | 12/2024 | Dgani .................. G01S 7/4972 |

FOREIGN PATENT DOCUMENTS

WO     2021085612 A1    5/2021

OTHER PUBLICATIONS

International Search report dated Jan. 23, 2023 for corresponding International Application No. PCT/IB2022/061159.

* cited by examiner

*Primary Examiner* — Joseph D Torres
(74) *Attorney, Agent, or Firm* — Michael Best & Friedrich LLP

(57) ABSTRACT

Time-of-Flight (ToF) sensors, methods, and non-transitory computer-readable media. In one example of the present disclosure, a ToF sensor includes an array of pixels and processing circuitry. The processing circuitry is configured to generate a plurality of ToF exposure control signals that control at least one pixel of the array of pixels to generate a plurality of ToF pixel signals, generate a plurality of error correcting code (ECC) exposure control signals that control the at least one pixel to generate a plurality of ECC pixel signals, and determine a distance from an object based on the plurality of ToF pixel signals and the plurality of ECC pixel signals.

20 Claims, 12 Drawing Sheets

| region | region code | | | |
|---|---|---|---|---|
| | b0 | b1 | b2 | b3 |
| 0 | 0 | 0 | 1 | 0 |
| 1 | 0 | 0 | 1 | 1 |
| 2 | 0 | 1 | 1 | 1 |
| 3 | 0 | 1 | 1 | 0 |
| 4 | 0 | 1 | 0 | 0 |
| 5 | 0 | 1 | 0 | 1 |
| 6 | 1 | 1 | 0 | 1 |
| 7 | 1 | 1 | 0 | 0 |
| 8 | 1 | 0 | 0 | 0 |
| 9 | 1 | 0 | 0 | 1 |
| 10 | 1 | 0 | 1 | 1 |
| 11 | 1 | 0 | 1 | 0 |

602

| region | incorrect bit | interpreted as |
|---|---|---|
| 3 | b0 | invalid |
| 7 | b2 | invalid |
| 11 | b1 | invalid |

| region | incorrect bit | interpreted as |
|---|---|---|
| 1 | b0 | 10 |
| 9 | b2 | 10 |
| 11 | b3 | 10 |

| region | incorrect bit | interpreted as |
|---|---|---|
| 3 | b0 | invalid |
| 3 | b1 | 0 |
| 3 | b2 | 4 |
| 3 | b3 | 2 |

FIG. 6

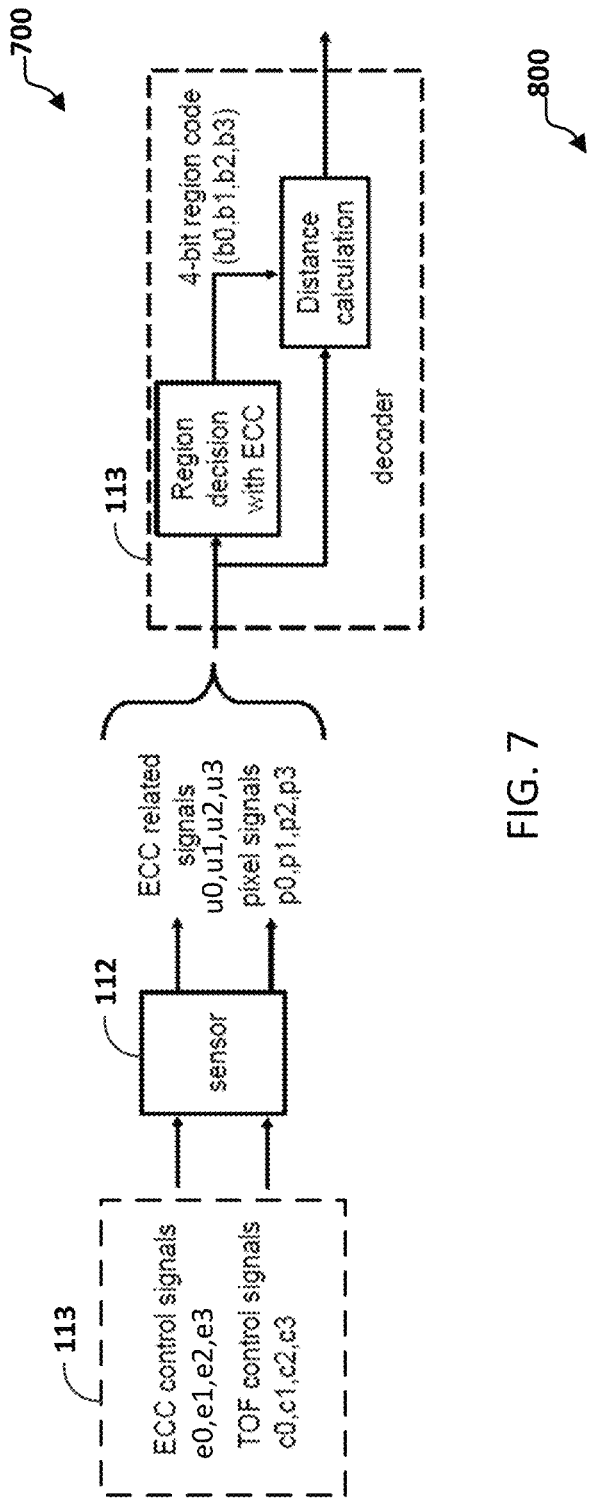

TIME-OF-FLIGHT SENSORS, METHODS, AND NON-TRANSITORY COMPUTER-READABLE MEDIA WITH ERROR CORRECTING CODE

BACKGROUND OF THE INVENTION

1. Field of the Invention

This application relates to Time-of-Flight (ToF) sensors, methods, and non-transitory computer-readable media with an error correcting code (ECC).

2. Description of Related Art

Time-of-flight (TOF) is a technique used in rebuilding three-dimensional (3D) images. The TOF technique includes calculating the distance between a light source and an object by measuring the time for light to travel from the light source to the object and return to a light-detection sensor, where the light source and the light-detection sensor are located in the same device.

Conventionally, an infrared light-emitting diode (LED) is used as the light source to ensure high immunity with respect to ambient light. The information obtained from the light that is reflected by the object may be used to calculate a distance between the object and the light-detection sensor, and the distance may be used to reconstruct the 3D images. The 3D images that are reconstructed may then be used in gesture and motion detection. Gesture and motion detection is being used in different applications including automotive, drone, and robotics, which require more accurate and faster acquisition of the information used to calculate the distance between the object and the light-detection source in order to decrease the amount of time necessary to reconstruct the 3D images.

Image sensing devices typically include an image sensor, an array of pixel circuits, signal processing circuitry and associated control circuitry. Within the image sensor itself, charge is collected in a photoelectric conversion device of the pixel circuit as a result of impinging light. Subsequently, the charge in a given pixel circuit is read out as an analog signal, and the analog signal is converted to digital form by an analog-to-digital converter (ADC).

However, there are many noise sources that affect an output of the ToF sensor. For example, some noise sources include shot noise in the photon, KTC noise in the circuit, system noise and fixed pattern noise from pixel and circuit design, and quantization noise in the ADC. All of these noise sources in the pixel data will contribute to depth noise.

BRIEF SUMMARY OF THE INVENTION

Consider a Time-of-Flight (ToF) decoding method that includes a region decoder plus distance calculation after a region has been decoded. Low signal to noise ratio (e.g., for long distance measurement) causes an incorrect region code decision, which causes a very large error in decoded distance. Accordingly, there exists a need for a ToF sensor that do not suffer from these deficiencies.

As described in greater detail below, a ToF sensor incorporates additional pixel signals to generate an error correcting code (ECC) with the ToF pixel signals. The ECC significantly reduces the probability of a region code decision error, and consequently, significantly increases accuracy in a decoded distance.

Various aspects of the present disclosure relate to ToF sensors, methods, and non-transitory computer-readable media. In one aspect of the present disclosure, a ToF sensor includes an array of pixels and processing circuitry. The processing circuitry configured to generate a plurality of ToF exposure control signals that control at least one pixel of the array of pixels to generate a plurality of ToF pixel signals, generate a plurality of error correcting code (ECC) exposure control signals that control the at least one pixel to generate a plurality of ECC pixel signals, and determine a distance from an object based on the plurality of ToF pixel signals and the plurality of ECC pixel signals.

Another aspect of the present disclosure is a method. The method includes generating, with processing circuitry, a plurality of ToF exposure control signals that control at least one pixel of an array of pixels to generate a plurality of ToF pixel signals. The method includes generating, with the processing circuitry, a plurality of error correcting code (ECC) exposure control signals that control the at least one pixel to generate a plurality of ECC pixel signals. The method also includes determining, with the processing circuitry, a distance from an object based on the plurality of ToF pixel signals and the plurality of ECC pixel signals.

In yet another aspect of the present disclosure, a non-transitory computer-readable medium comprises instructions that, when executed by an electronic processor, cause the electronic processor to perform a set of operations. The set of operations includes generating, with processing circuitry, a plurality of ToF exposure control signals that control at least one pixel of an array of pixels to generate a plurality of ToF pixel signals. The set of operations includes generating, with the processing circuitry, a plurality of error correcting code (ECC) exposure control signals that control the at least one pixel to generate a plurality of ECC pixel signals. The set of operations also includes determining, with the processing circuitry, a distance from an object based on the plurality of ToF pixel signals and the plurality of ECC pixel signals.

This disclosure may be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, digital signal processors, and other suitable forms. The foregoing summary is intended solely to give a general idea of various aspects of the present disclosure, and does not limit the scope of the present disclosure.

BRIEF DESCRIPTION OF THE DRAWINGS

These and other more detailed and specific features of various embodiments are more fully disclosed in the following description, reference being had to the accompanying drawings, in which:

FIG. 6 is a diagram illustrating different example bit errors in a region code.

FIG. 7 is a diagram illustrating the image sensor and the ToF/ECC decoder of FIG. 1, in accordance with various aspects of the present disclosure.

FIG. 8 is a diagram illustrating four different examples of ECC.

FIG. 15 is a diagram illustrating an array of codewords corresponding to Ham4 ECC including region code bits and ECC bits, in accordance with various aspects of the present disclosure.

FIG. 16 is a diagram illustrating an array of codewords corresponding to Gray4 ECC which include region code bits and ECC bits, in accordance with various aspects of the present disclosure.

DETAILED DESCRIPTION

In the following description, numerous details are set forth, such as flowcharts, equations, and circuit configurations. It will be readily apparent to one skilled in the art that these specific details are exemplary and do not to limit the scope of this application.

In this manner, the present disclosure provides improvements in the technical field of time-of-flight sensors, as well as in the related technical fields of image sensing and image processing.

Figure 1:
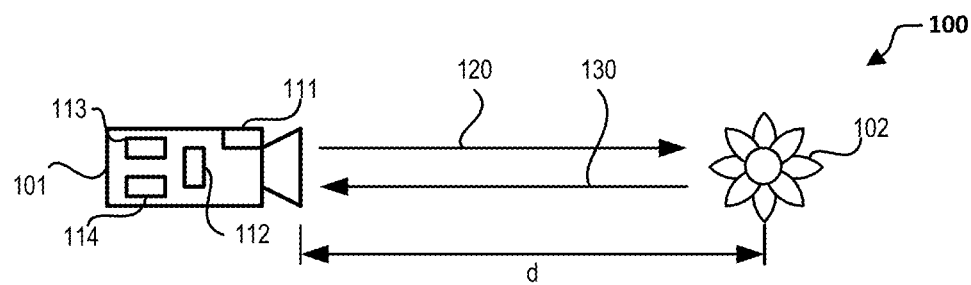
FIG. 1 is a diagram that illustrates an example Time-of-Flight (ToF) imaging environment, in accordance with various aspects of the present disclosure.

FIG. 1 is a diagram illustrating an example of a time-of-flight (ToF) imaging environment 100, according to various aspects of the present disclosure. In the example of FIG. 1, the ToF imaging environment 100 includes a ToF imaging system 101 that is configured to image an object 102 located a distance d away. The ToF imaging system 101 includes a light generator 111 configured to generate an emitted light wave 120 toward the object 102 and an image sensor 112 configured to receive a reflected light wave 130 from the object 102. The emitted light wave 120 may have a periodic waveform. The image sensor 112 may be any device capable of converting incident radiation into signals. For example, the image sensor may be a Complementary Metal-Oxide Semiconductor (CMOS) Image Sensor (CIS), a Charge-Coupled Device (CCD), or other suitable image sensor. The ToF imaging system 101 may further include distance determination circuitry such as a controller 113 (for example, a microprocessor or other suitable processing device) and a memory 114, which may operate to perform one or more examples of time-of-flight processing as described below. The light generator 111, the image sensor 112, the controller 113, and the memory 114 may be implemented on the same semiconductor piece, or they may be implemented separately and are communicatively connected to each other via one or more communication buses.

The light generator 111 may be, for example, a light emitting diode (LED), a laser diode, or any other light generating device or combination of devices, and the light waveform may be controlled by the controller 113. The light generator may operate in the infrared range so as to reduce interference from the visible spectrum of light, although any wavelength range perceivable by the image sensor 112 may be utilized.

In some examples, the controller 113 includes an error correcting code (ECC) generator, a ToF signal generator, and an ToF/ECC decoder. The ECC generator generates ECC pixel exposure control signals. The ToF signal generator generates ToF pixel exposure control signals. The ToF/ECC decoder decodes a region code from ToF pixel signals based on the ToF pixel exposure control signals together with ECC pixel signals based on the ECC pixel exposure control signals. The ECC pixel signals increase a probability that the region code decoded from the ToF pixel signals is a correct region code, which increases distance calculation accuracy and extends operating range of the ToF imaging system 101. The controller 113 is described in greater detail in FIGS. 7-24.

Figure 2:
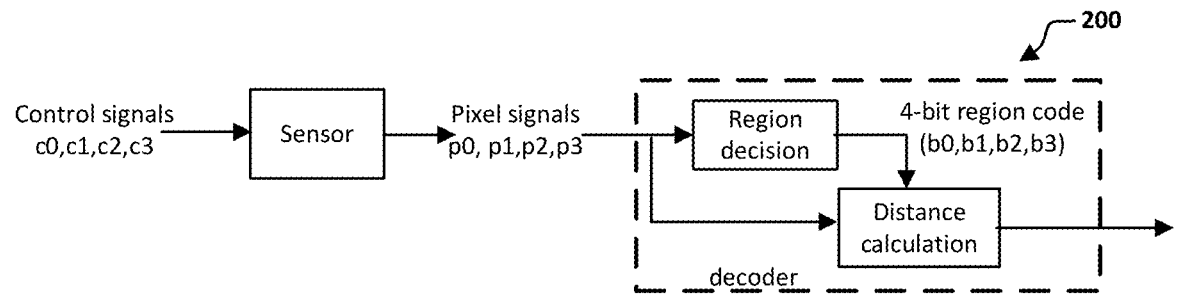
FIG. 2 is a diagram illustrating processes performed by a controller.

FIG. 2 is a diagram illustrating a process 200 performed by a comparative ToF imaging system. As illustrated in FIG. 2, the process 200 includes a ToF image sensor receiving ToF exposure control signals c0, c1, c2, and c3 from a controller and outputting the ToF pixel signals p0, p1, p2, and p3. The process 200 includes a decoder of the controller receiving the pixel signals p0, p1, p2, and p3 and making a region decision from the pixel signals p0, p1, p2, and p3 by outputting a four-bit region code b0, b1, b2, and b3. The process 200 also includes the decoder performing a distance calculation of an object based on the pixel signals p0, p1, p2, and p3 and the four-bit region code b0, b1, b2, and b3.

Figure 3:
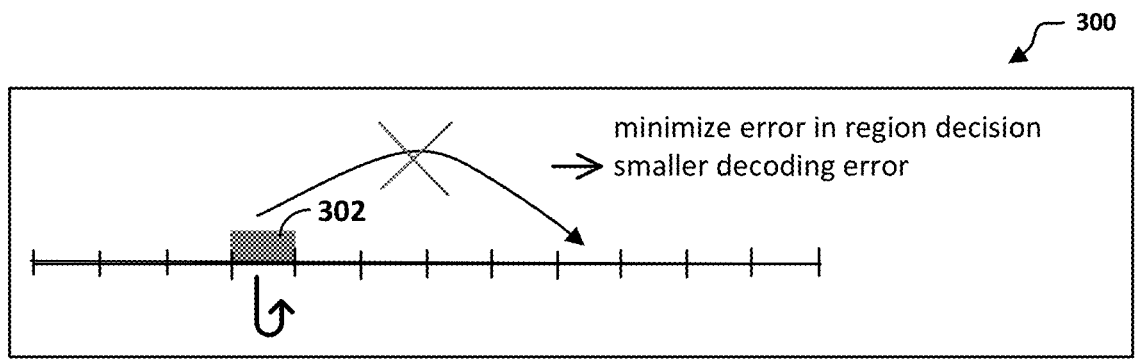
FIG. 3 is a diagram illustrating an error in a region decision.

FIG. 3 is a diagram illustrating an error 300 in a region decision. As illustrated in FIG. 3, an object 302 may be located in the fourth region (as highlighted). However, an error 300 in one or more bits of the four-bit region code b0, b1, b2, and b3 may result in the region code incorrectly indicating that the object is in the ninth region. The incorrect region code may result in a significant error in the calculated distance. Moreover, the error 300 in the one or more bits of the four-bit region code b0, b1, b2, and b3 may be from noise in the pixel signals.

Figure 4:
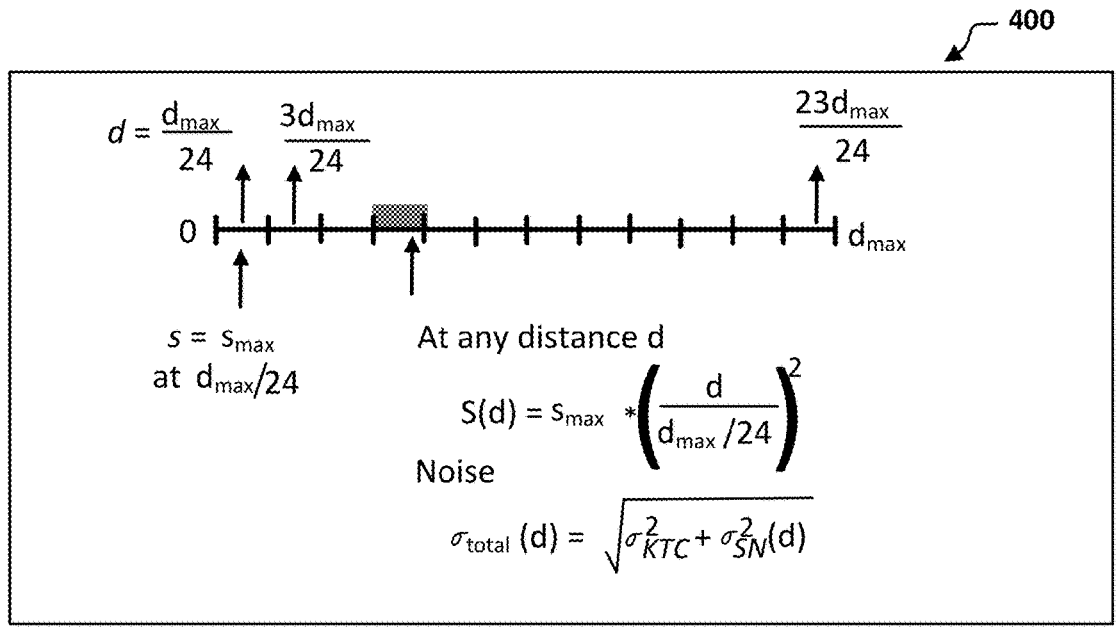
FIG. 4 is a diagram illustrating impact of noise on bit error for a region code.

FIG. 4 is a diagram illustrating impact 400 of noise on bit error for a region code. As illustrated in FIG. 4, there are 12 regions between zero and the maximum operating distance ($d_{max}$). Considering the midpoint for each region, then the distance is equal to Expression (1).

$$d = \frac{(2x+1) \times d_{max}}{2 \times N} \quad (1)$$

In Expression (1), x is equal to the region index from 0 to 11, $d_{max}$ is equal to the maximum operating distance, and N is the number of regions between zero and $d_{max}$. In the above example, N is equal to 12.

As illustrated in FIG. 4, the maximum signal ($s_{max}$) is at $d_{max}/(2N)$, which is the first region. In this consideration, the signals at distances closer to (i.e., smaller than) the point $d_{max}/(2N)$ are ignored for two reasons. First, objects at very close distance will cause saturation to the pixel signals. Second, objects at very close distance may exceed the capability of the camera lens which may not be able to focus. At any distance d, the signal is equal to Expression (2) below.

$$s(d) = s_{max} * \left(\frac{d}{d_{max}/(2N)}\right)^2 \quad (2)$$

In Expression (2), $s_{max}$ is equal to the maximum signal strength, $d_{max}$ is equal to the maximum operating distance, and N is the total number of regions between zero and $d_{max}$. In the above example, N is equal to 12.

However, the signal is also subject to noise. At any distance d, the noise is equal to Expression (3) below.

$$\sigma_{total}(d) = \sqrt{\sigma_{KTC}^2 + \sigma_{SN}^2(d)} \quad (3)$$

The KTC noise is sampling noise that does not depend on distance. The SN noise is signal noise that depends on the signal level, and consequently, depends on the distance because the signal level depends on the distance.

Figure 5:
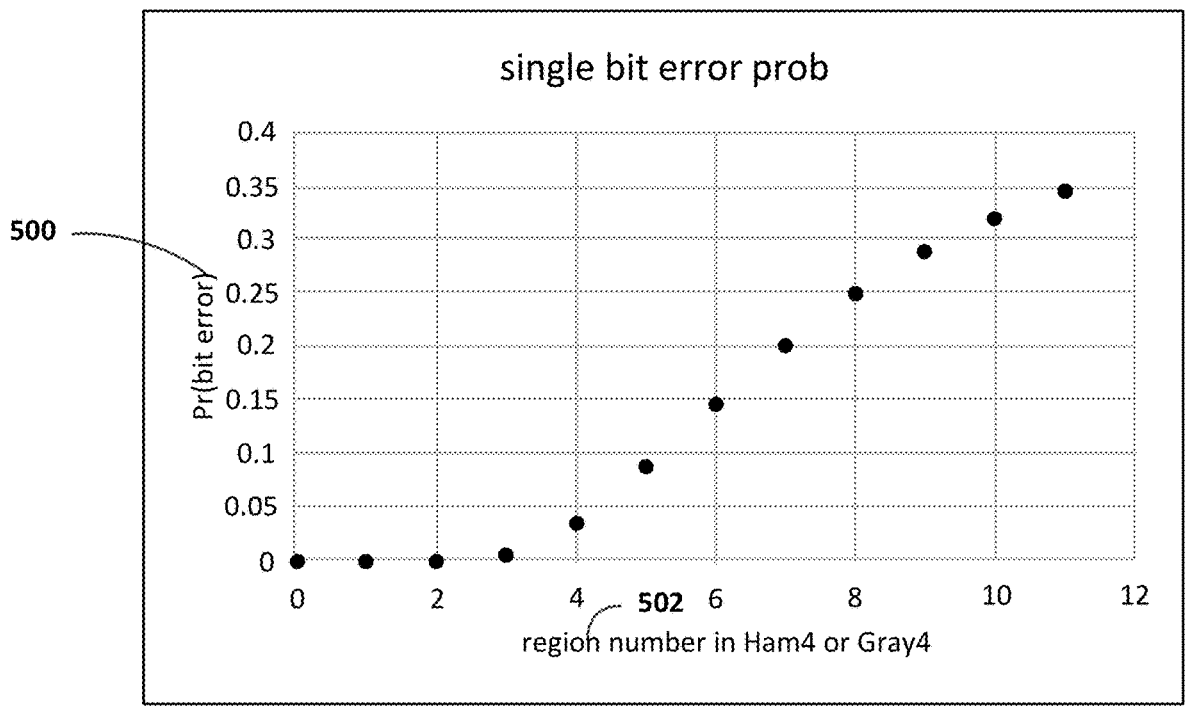
FIG. 5 is a chart illustrating a probability of a bit error versus a region number.

A bit error in the region code occurs when the noise sample is higher than s(d)/2. FIG. 5 is a chart illustrating a probability of a single bit error 500 versus a region number 502. As illustrated in FIG. 5, the probability of a single bit error 500 is approximately 0% in regions 0-2 and rises to a probability of 10% by region 5. The probability of the single bit error 500 further rises to 25% by region 8 and 35% at region 11.

However, the region code is a four-bit code and not a single bit code. A correct region code requires all bits to be correct. Therefore, the overall probability that the region code is incorrect is the probability that includes at least one-bit error, which is much greater than the probability of the single bit error 500.

For example, each bit in region 8 has a 25% chance of a bit error. Therefore, the region code of region 8 has a much higher cumulative chance of a bit error than just 25%, for example, greater than 50%. Consequently, the region code of region 8 may be assumed to have a high probability of error due to the higher cumulative chance of a bit error. In other words, the maximum operating distance to have an acceptable probability of error is not actually $d_{max}$, but a much shorter distance than $d_{max}$ because of the high likelihood that the region code will have a bit error at or above the fifth region.

FIG. 6 is a diagram illustrating different example bit errors in a region code. As illustrated in FIG. 6, the diagram 600 includes regions 0-11 that correspond to a specific region code in a look-up table 602. For example, region 0 corresponds to region b0, b1, b2, and b3 equal to 0, 0, 1, 0, respectively. Region 1 corresponds to region b0, b1, b2, and b3 equal to 0, 0, 1, 1, respectively. Region 2 corresponds to region b0, b1, b2, and b3 equal to 0, 1, 1, 1, respectively. Region 3 corresponds to region b0, b1, b2, and b3 equal to 0, 1, 1, 0, respectively. Region 4 corresponds to region b0, b1, b2, and b3 equal to 0, 1, 0, 0, respectively. Region 5 corresponds to region b0, b1, b2, and b3 equal to 0, 1, 0, 1, respectively. Region 6 corresponds to region b0, b1, b2, and b3 equal to 1, 1, 0, 1, respectively. region 0 corresponds to region b0, b1, b2, and b3 equal to 0, 0, 1, 0, respectively. Region 7 corresponds to region b0, b1, b2, and b3 equal to 1, 1, 0, 0, respectively. Region 8 corresponds to region b0, b1, b2, and b3 equal to 1, 0, 0, 0, respectively. Region 9 corresponds to region b0, b1, b2, and b3 equal to 1, 0, 0, 1, respectively. Region 10 corresponds to region b0, b1, b2, and b3 equal to 1, 0, 1, 1, respectively. Region 11 corresponds to region b0, b1, b2, and b3 equal to 1, 0, 1, 0, respectively.

However, regions 0-11 may correspond to different region codes than the region codes illustrated in FIG. 6. The region codes of FIG. 6 are an example for ease of understanding and the present disclosure is not limited to the examples provided in FIG. 6.

Additionally, as illustrated in FIG. 6, an incorrect bit will result in the region being interpreted in an incorrect region or deemed "invalid." To be deemed "invalid," a region code must have an incorrect bit that changes the correct region code to a region code that does not exist in the look-up table 602. For example, when region 3 has an incorrect bit at bit b0, then the resulting region code 1110 is "invalid" because 1110 is not present in the look-up table 602. The same invalidity applies to regions 7 and 11 and incorrect bits at bits b2 and b1, respectively.

With respect to incorrect regions, a region code will have an incorrect bit that changes the correct region code to a region code that is different from the correct region code. For example, when region 1 has an incorrect bit at bit b0, then the resulting region code 1011 is "incorrect" because 1011 corresponds to region 10. The same error applies to regions 9 and 11 and incorrect bits at bits b2 and b3, respectively.

Lastly, a single region may be interpreted four different ways because the single region includes four different bits that may be incorrect. For example, when region 3 has an incorrect bit at bit b0, then the resulting region code 1110 is "invalid" because 1110 is not present in the look-up table 602. Alternatively, when region 3 has an incorrect bit at bits b1, b2, or b3, then the resulting region codes 0010, 0100, and 0111 are "incorrect" because these region codes correspond to regions 0, 4, and 2, respectively, instead of the correct region, i.e., region 3.

FIG. 7 is a flowchart illustrating a process 700 performed by the ToF imaging system 101, in accordance with various aspects of the present disclosure. As illustrated in FIG. 7, the process 700 includes a ToF image sensor (e.g., the image sensor 112 of FIG. 1) receiving ECC control signals e0, e1, e2, and e3 and ToF exposure control signals c0, c1, c2, and c3 from a controller (e.g., the controller 113 of FIG. 1) and outputting ToF pixel signals p0, p1, p2, and p3 and ECC pixel signals u0, u1, u2, and u3.

The process 700 includes a decoder of the controller (e.g., the ECC/ToF decoder of the controller 113) receiving the ToF pixel signals p0, p1, p2, and p3 and the ECC pixel signals u0, u1, u2, and u3 and makes a region decision from the pixel signals p0, p1, p2, and p3 and the ECC pixel signals u0, u1, u2, and u3 by outputting a four bit region code b0, b1, b2, and b3. The process 700 also includes the decoder performing a distance calculation of an object (e.g., the object 102) based on the ToF pixel signals p0, p1, p2, and p3, the ECC pixel signals u0, u1, u2, and u3, and the four bit region code b0, b1, b2, and b3.

FIG. 8 is a chart illustrating four different examples of ECC. As illustrated in FIG. 8, the chart 800 includes four different ECCs: Hamming (7,3), Hamming (8,4), tBCH (15,7,2), and tBCH (15,5,3). Hamming (7,3) uses three check bits. Hamming (8,4) uses four check bits. tBCH (15,7,2) uses eight check bits. tBCH (15,5,3) uses ten check bits.

Hamming (7,3) has the capability of correcting one incorrect bit. Hamming (8,4) has the capability of correcting one incorrect bit and detecting two incorrect bits. tBCH (15,7,2) has the capability of correcting two incorrect bits. tBCH (15,5,3) has the capability of correcting three incorrect bits.

All four ECCs are easy to encode an easy to decide on whether an error exists with a particular bit. However, tBCH (15,7,2) and tBCH (15,5,3) are complex to determine which bits are incorrect, whereas Hamming (7,3) and Hamming (8,4) are easier than tBCH (15,7,2) and tBCH (15,5,3) to determine the incorrect bit.

The present disclosure is not limited to these four ECCs and any ECC may be used. Of the four ECCs, tBCH (15,5,3) has the best performance. However, tBCH (15,5,3) also requires fourteen signals, which results in a big frame delay, and a complex decoder. Therefore, Hamming (8,4) is selected for discussion with respect to FIGS. 11-24 because Hamming (8,4) has excellent performance while requiring eight signals and a less complex decoder than tBCH (15,5,3).

Figure 9:
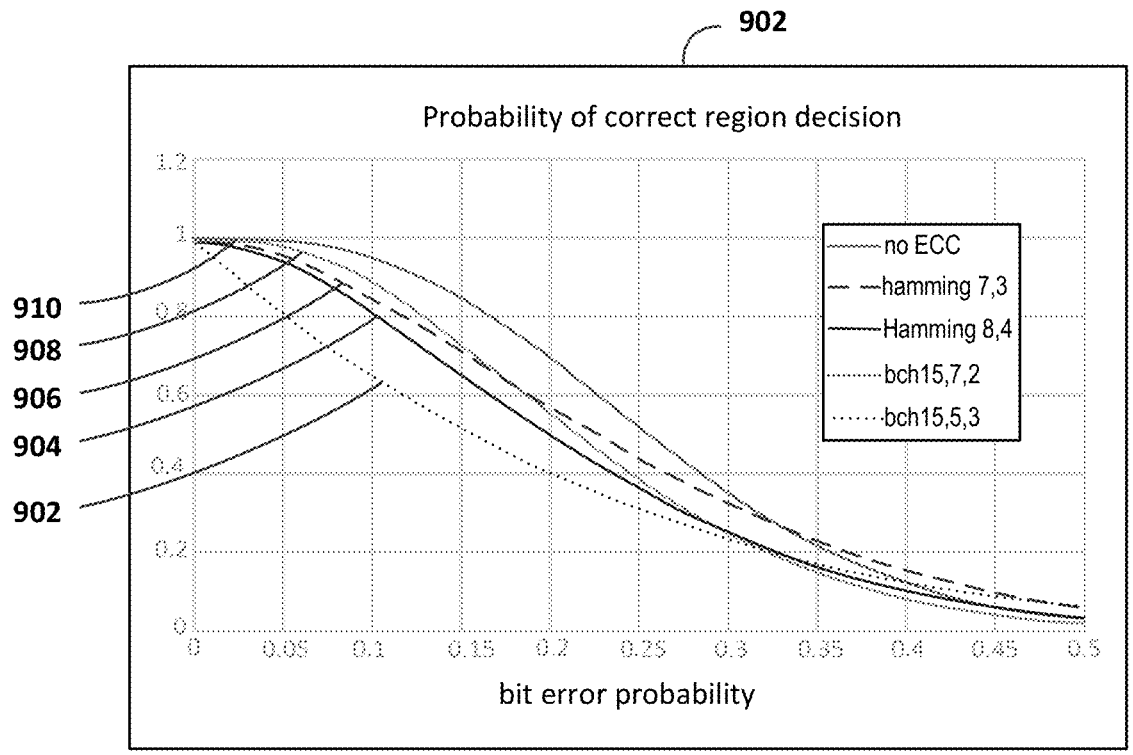
FIG. 9 is a diagram illustrating a probability of a correct region decision across the four different examples of ECC of FIG. 8 and no ECC, in accordance with various aspects of the present disclosure.

FIG. 9 is a diagram illustrating a probability of a correct region decision across the four different examples of ECC of FIG. 8 and no ECC, in accordance with various aspects of the present disclosure. As illustrated in FIG. 9, at a bit error probability of 5%, the probability of a correct region decision is approximately 80% for no ECC 902, approximately 95% for Hamming (8,4) 904, approximately 96% for Hamming (7,3) 906, approximately 98% for tBCH (15,7,2) 908, and approximately 99% for tBCH (15,5,3) 910.

Further, as illustrated in FIG. 9, at a bit error probability of 15%, the probability of a correct region decision is approximately 50% for no ECC 902, approximately 65% for Hamming (8,4) 904, approximately 70% for Hamming (7,3) 906, approximately 73% for tBCH (15,7,2) 908, and approximately 85% for tBCH (15,5,3) 910.

Additionally, as illustrated in FIG. 9, at a bit error probability of 30%, the probability of a correct region decision is approximately 25% for no ECC 902, approximately 28% for Hamming (8,4) 904, approximately 28% for tBCH (15,7,2) 908, approximately 35% for Hamming (7,3) 906, and approximately 38% for tBCH (15,5,3) 910.

Lastly, as illustrated in FIG. 9, at a bit error probability of 45%, the probability of a correct region decision is approximately 10% for no ECC 902, approximately 7% for Hamming (8,4) 904, approximately 5% for tBCH (15,7,2) 908, approximately 12% for Hamming (7,3), and approximately 7% for tBCH (15,5,3) 910.

Figure 10:
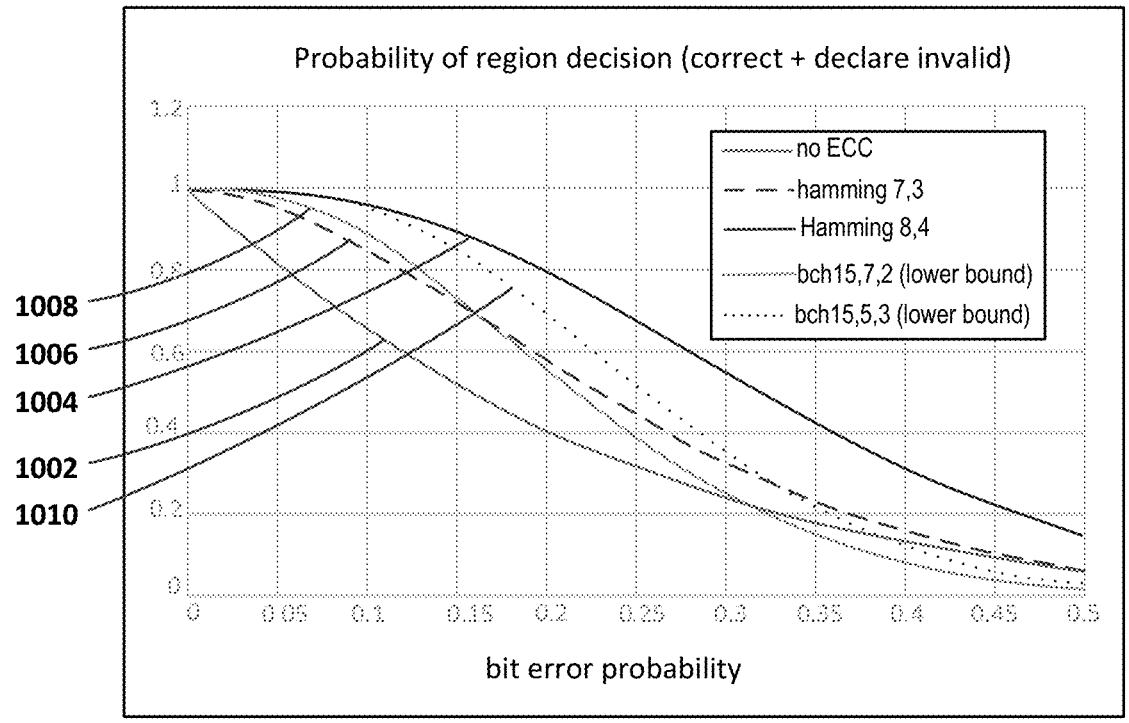
FIG. 10 is a diagram illustrating a probability of a correct region decision with invalidity across the four different examples of ECC of FIG. 8 and no ECC, in accordance with various aspects of the present disclosure.

FIG. 10 is a diagram illustrating a probability of a correct region decision and declare invalidity across the four different examples of ECC of FIG. 8 and no ECC, in accordance with various aspects of the present disclosure. As illustrated in FIG. 10, at a bit error probability of 5%, the probability of a correct region decision and declare invalidity is approximately 80% for no ECC 1002, approximately 99% for Hamming (8,4) 1004, approximately 96% for Hamming (7,3) 1006, approximately 98% for tBCH (15,7,2) 1008, and approximately 99% for tBCH (15,5,3) 1010.

Further, as illustrated in FIG. 10, at a bit error probability of 15%, the probability of a correct region decision and declare invalidity is approximately 50% for no ECC 1002, approximately 90% for Hamming (8,4) 1004, approximately 73% for Hamming (7,3) 1006, approximately 75% for tBCH (15,7,2) 1008, and approximately 88% for tBCH (15,5,3) 1010.

Additionally, as illustrated in FIG. 10, at a bit error probability of 30%, the probability of a correct region decision and declare invalidity is approximately 23% for no ECC 1002, approximately 55% for Hamming (8,4) 1004, approximately 25% for tBCH (15,7,2) 1008, approximately 35% for Hamming (7,3) 1006, and approximately 38% for tBCH (15,5,3) 1010.

Lastly, as illustrated in FIG. 10, at a bit error probability of 45%, the probability of a correct region decision and declare invalidity is approximately 10% for no ECC 1002, approximately 22% for Hamming (8,4) 1004, approximately 5% for tBCH (15,7,2) 1008, approximately 12% for Hamming (7,3) 1006, and approximately 7% for tBCH (15,5,3) 1010.

Figure 11:
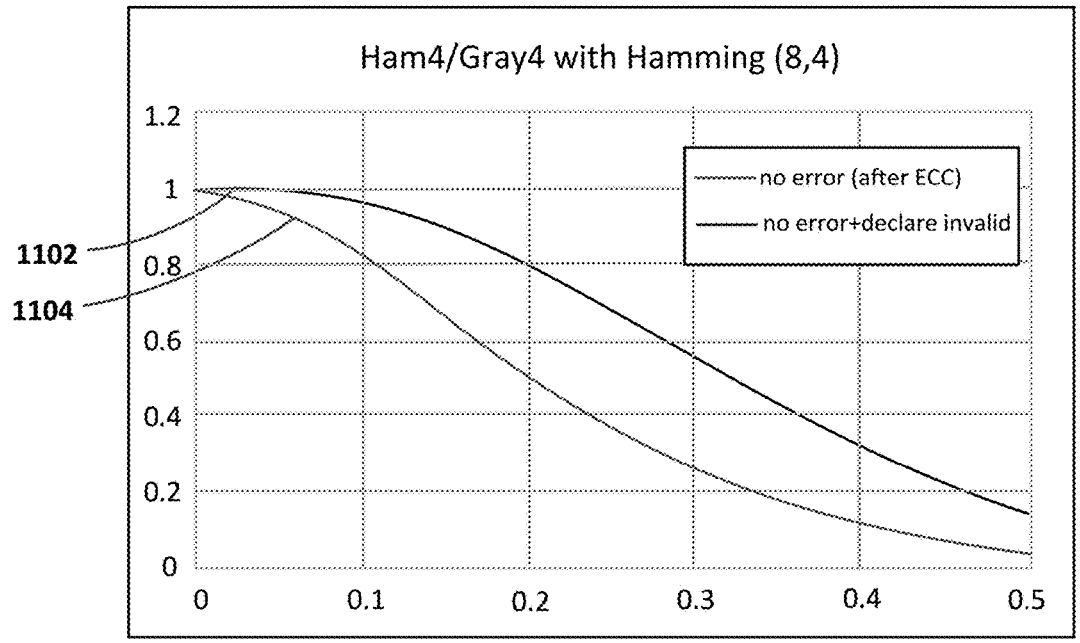
FIG. 11 is a diagram illustrating a performance of Hamming (8,4) code in the ToF sensor, in accordance with various aspects of the present disclosure.

FIG. 11 is a diagram illustrating a performance of Hamming (8,4) in the ToF sensor 112, in accordance with various aspects of the present disclosure. Hamming (8,4) requires eight pixel signals per pixel. Hamming (8,4) may also correct one-bit error and may detect two bit errors. Hamming (8,4) does not handle three or more bit errors.

As illustrated in FIG. 11, at a bit error probability of 5%, the probability of a correct region decision 1102 is approximately 96% and the probability of a correct region decision and declare invalidity 1104 is approximately 99%. Further, as illustrated in FIG. 11, at a bit error probability of 15%, the probability of a correct region decision is approximately 68% and the probability of a correct region decision and declare invalidity is approximately 90%.

Additionally, as illustrated in FIG. 11, at a bit error probability of 30%, the probability of a correct region decision is approximately 25% and the probability of a correct region decision and declare invalidity is approximately 55%. Lastly, as illustrated in FIG. 11, at a bit error probability of 45%, the probability of a correct region decision is approximately 7% and the probability of a correct region decision and declare invalidity is approximately 21%.

Figure 12:
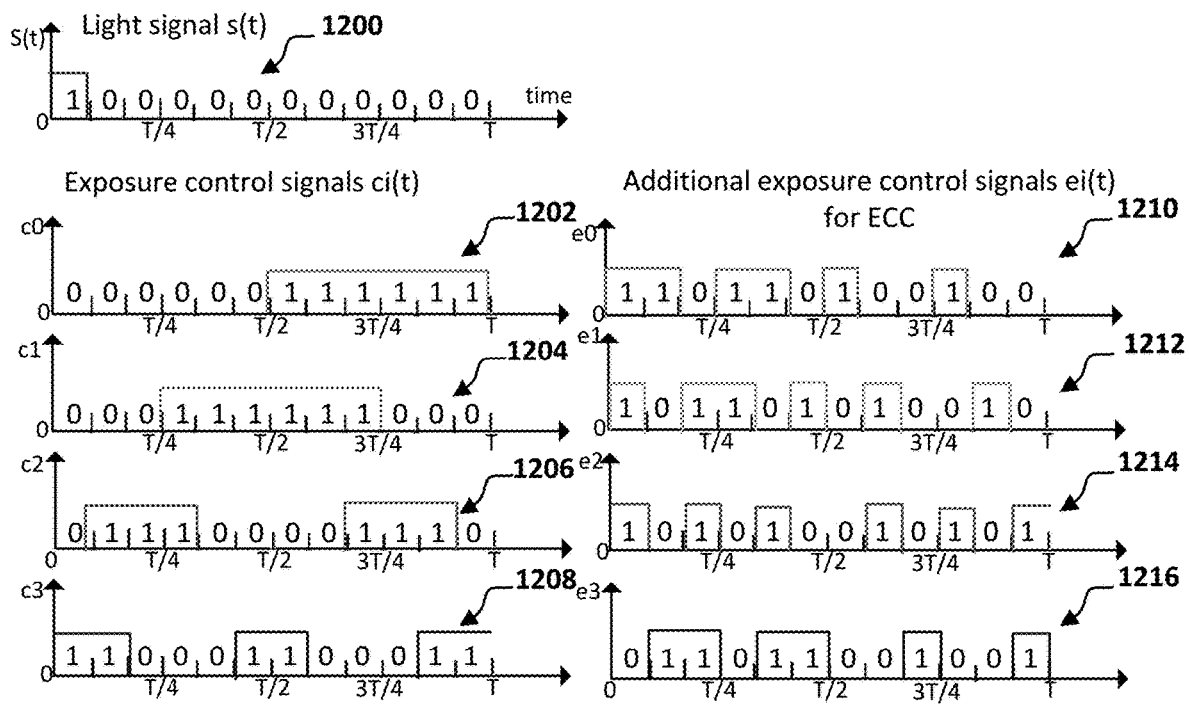
FIG. 12 is a diagram illustrating exposure control signals with respect to Ham4 and the Hamming (8,4) code in the ToF sensor, in accordance with various aspects of the present disclosure.

FIG. 12 is a diagram illustrating exposure control signals with respect to Ham4 and the Hamming (8,4) code in the ToF sensor, in accordance with various aspects of the present disclosure. As illustrated in FIG. 12, the exposure control signals include a first set of exposure control signals 1202-1208 and a second set of exposure control signals 1210-1216 relative to a light signal 1200. The first set of exposure control signals 1202-1208 are ToF exposure control signals (e.g., c0, c1, c2, and c3) that control a given pixel to generate ToF pixel signals (e.g., p0, p1, p2, and p3). The second set of exposure control signals 1210-1216 are ECC exposure control signals (e.g., e0, e1, e2, and e3) that control a given pixel to generate ECC pixel signals (e.g., u0, u1, u2, and u3).

The light signal 1200 is a light emitted by a light generator (e.g. the light generator 111). The light signal 1200 is high during the first 1/12 of the period T. The light signal 1200 when divided into twelve bits over period T corresponds to 100000000000.

The exposure control signal 1202 is a first exposure control signal for the given pixel. The exposure control signal 1202 is high during the second half of the period T. The exposure control signal 1202 when divided into twelve bits over period T corresponds to 000000111111.

The exposure control signal 1204 is a second exposure control signal for the given pixel. The exposure control signal 1204 is high during the middle of the period T. The exposure control signal 1204 when divided into twelve bits over period T corresponds to 000111111000.

The exposure control signal 1206 is a third exposure control signal for the given pixel. The exposure control signal 1206 is high during two distinct portions of the period T. The exposure control signal 1206 when divided into twelve bits over period T corresponds to 011100001110.

The exposure control signal 1208 is a fourth exposure control signal for the given pixel. The exposure control signal 1208 as shown is high during three distinct portions of the period T. Since the signals are periodic and repeats with the same pattern after the initial period, it can be observed that the third high period in 1208 in one cycle will join with the first high period of 1208 in the following cycle. Hence, the signal 1208 is high during two distinct portions of the period T. The exposure control signal 1208 when divided into twelve bits over period T corresponds to 110001100011.

The exposure control signal 1210 is a fifth exposure control signal for the given pixel. The exposure control signal 1210 is high during four distinct portions of the period T. The exposure control signal 1210 when divided into twelve bits over period T corresponds to 110110100100.

The exposure control signal 1212 is a sixth exposure control signal for the given pixel. The exposure control signal 1212 is high during five distinct portions of the period T. The exposure control signal 1212 when divided into twelve bits over period T corresponds to 101101010010.

The exposure control signal 1214 is a seventh exposure control signal for the given pixel. The exposure control signal 1214 as shown is high during six distinct portions of the period T. Since the signals are periodic and repeats with the same pattern after the initial period, it can be observed that the sixth high period in 1214 in one cycle will join with the first high period of 1214 in the following cycle. Hence, the signal 1214 is high during five distinct portions of the period T. The exposure control signal 1214 when divided into twelve bits over period T corresponds to 101010010101.

Lastly, the exposure control signal 1216 is an eighth exposure control signal for the given pixel. The exposure control signal 1216 is high during four distinct portions of the period T. The exposure control signal 1216 when divided into twelve bits over period T corresponds to 011011001001.

Figure 13:
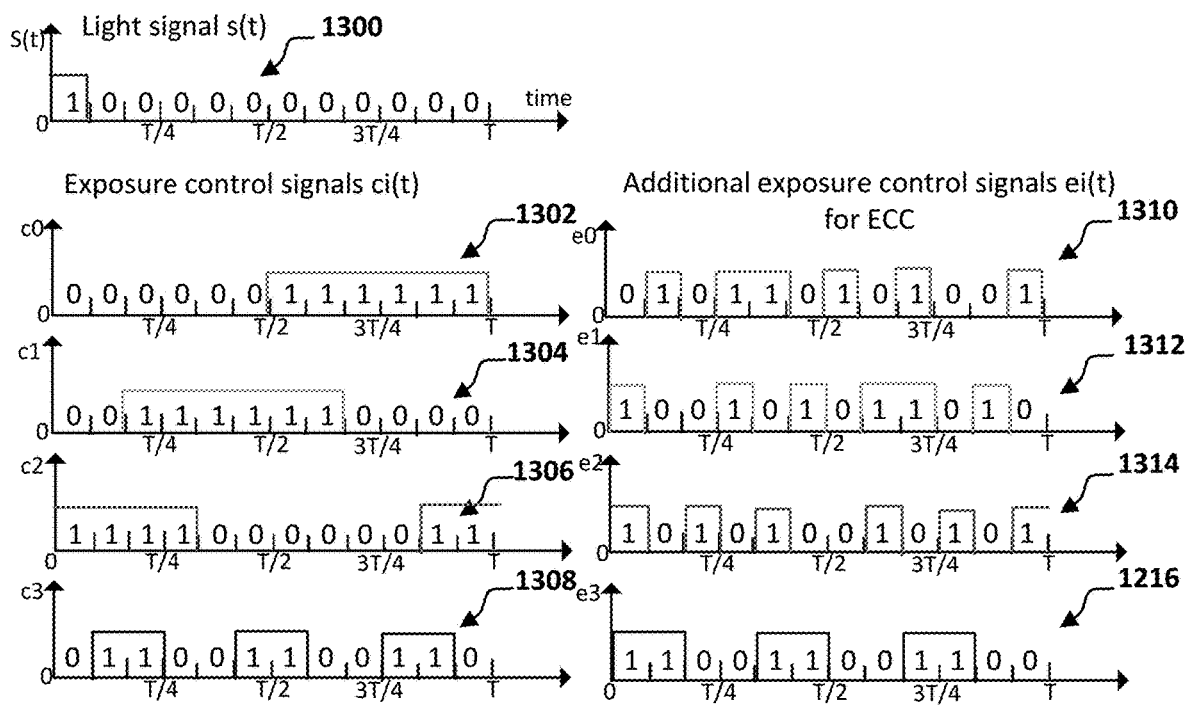
FIG. 13 is a diagram illustrating exposure control signals with respect to Gray4 and the Hamming (8,4) code in the ToF sensor, in accordance with various aspects of the present disclosure.

FIG. 13 is a diagram illustrating exposure control signals with respect to Gray4 and the Hamming (8,4) code in the ToF sensor, in accordance with various aspects of the present disclosure. As illustrated in FIG. 13, the exposure control signals include a first set of exposure control signals 1302-1308 and a second set of exposure control signals 1310-1316 relative to a light signal 1300. The first set of exposure control signals 1302-1308 are ToF exposure control signals (e.g., c0, c1, c2, and c3) that control a given pixel to generate ToF pixel signals (e.g., p0, p1, p2, and p3). The second set of exposure control signals 1310-1316 are ECC exposure control signals (e.g., e0, e1, e2, and e3) that control a given pixel to generate ECC pixel signals (e.g., u0, u1, u2, and u3).

The light signal 1300 is a light emitted by a light generator (e.g. the light generator 111). The light signal 1300 is high during the first 1/12 of the period T. The light signal 1300 when divided into twelve bits over period T corresponds to 100000000000.

The exposure control signal 1302 is a first exposure control signal for the given pixel. The exposure control signal 1302 is high during the second half of the period T. The exposure control signal 1302 when divided into twelve bits over period T corresponds to 000000111111.

The exposure control signal 1304 is a second exposure control signal for the given pixel. The exposure control signal 1304 is high during a portion of the period T. The exposure control signal 1304 when divided into twelve bits over period T corresponds to 001111110000.

The exposure control signal 1306 is a third exposure control signal for the given pixel. The exposure control signal 1306 as shown is high during two distinct portions of the period T. Since the signals are periodic and repeats with the same pattern after the initial period, it can be observed that the second high period in 1306 in one cycle will join with the first high period of 1306 in the following cycle. Hence, the signal 1306 is high during one distinct portion of the period T. The exposure control signal 1306 when divided into twelve bits over period T corresponds to 111100000011.

The exposure control signal 1308 is a fourth exposure control signal for the given pixel. The exposure control signal 1308 is high during three distinct portions of the period T. The exposure control signal 1308 when divided into twelve bits over period T corresponds to 011001100110.

The exposure control signal 1310 is a fifth exposure control signal for the given pixel. The exposure control signal 1310 is high during five distinct portions of the period T. The exposure control signal 1310 when divided into twelve bits over period T corresponds to 010110101001.

The exposure control signal 1312 is a sixth exposure control signal for the given pixel. The exposure control signal 1312 is high during five distinct portions of the period T. The exposure control signal 1312 when divided into twelve bits over period T corresponds to 100101011010.

The exposure control signal 1314 is a seventh exposure control signal for the given pixel. The exposure control signal 1314 as shown is high during six distinct portions of the period T. Since the signals are periodic and repeats with the same pattern after the initial period, it can be observed that the sixth high period in 1314 in one cycle will join with the first high period of 1314 in the following cycle. Hence, the signal 1314 is high during five distinct portions of the period T. The exposure control signal 1314 when divided into twelve bits over period T corresponds to 101010010101.

Lastly, the exposure control signal 1316 is an eighth exposure control signal for the given pixel. The exposure control signal 1316 is high during three distinct portions of the period T. The exposure control signal 1316 when divided into twelve bits over period T corresponds to 110011001100.

Figure 14:
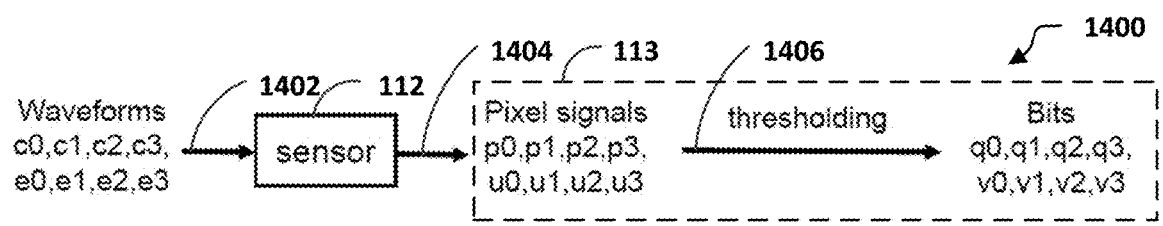
FIG. 14 is a flowchart illustrating a process for thresholding pixel signals to produce ToF and ECC bits, in accordance with various aspects of the present disclosure.

FIG. 14 is a flowchart illustrating a process 1400 for thresholding pixel signals to produce with ToF and ECC bits, in accordance with various aspects of the present disclosure. As illustrated in FIG. 14, the process 1400 includes an image sensor (e.g., the image sensor 112) receiving eight exposure control signal waveforms c0, c1, c2, c3, e0, e1, e2, and e3 (at arrow 1402) and outputting eight pixel signals p0, p1, p2, p3, u0, u1, u2, and u3 to processing circuitry (e.g., the controller 113) (at arrow 1404). For example, the process 1400 includes an image sensor (e.g., the image sensor 112) receiving eight exposure control signal waveforms as described above in FIGS. 12 and 13.

The process 1400 also includes the processing circuitry (e.g., the controller 113) receiving the eight pixel signals p0, p1, p2, p3, u0, u1, u2, and u3 (at arrow 1404) and thresholding the eight pixel signals p0, p1, p2, p3, u0, u1, u2, and u3 to generate eight threshold bits q0, q1, q2, q3, v0, v1, v2, and v3 (at arrow 1406).

Figures 15, 16:
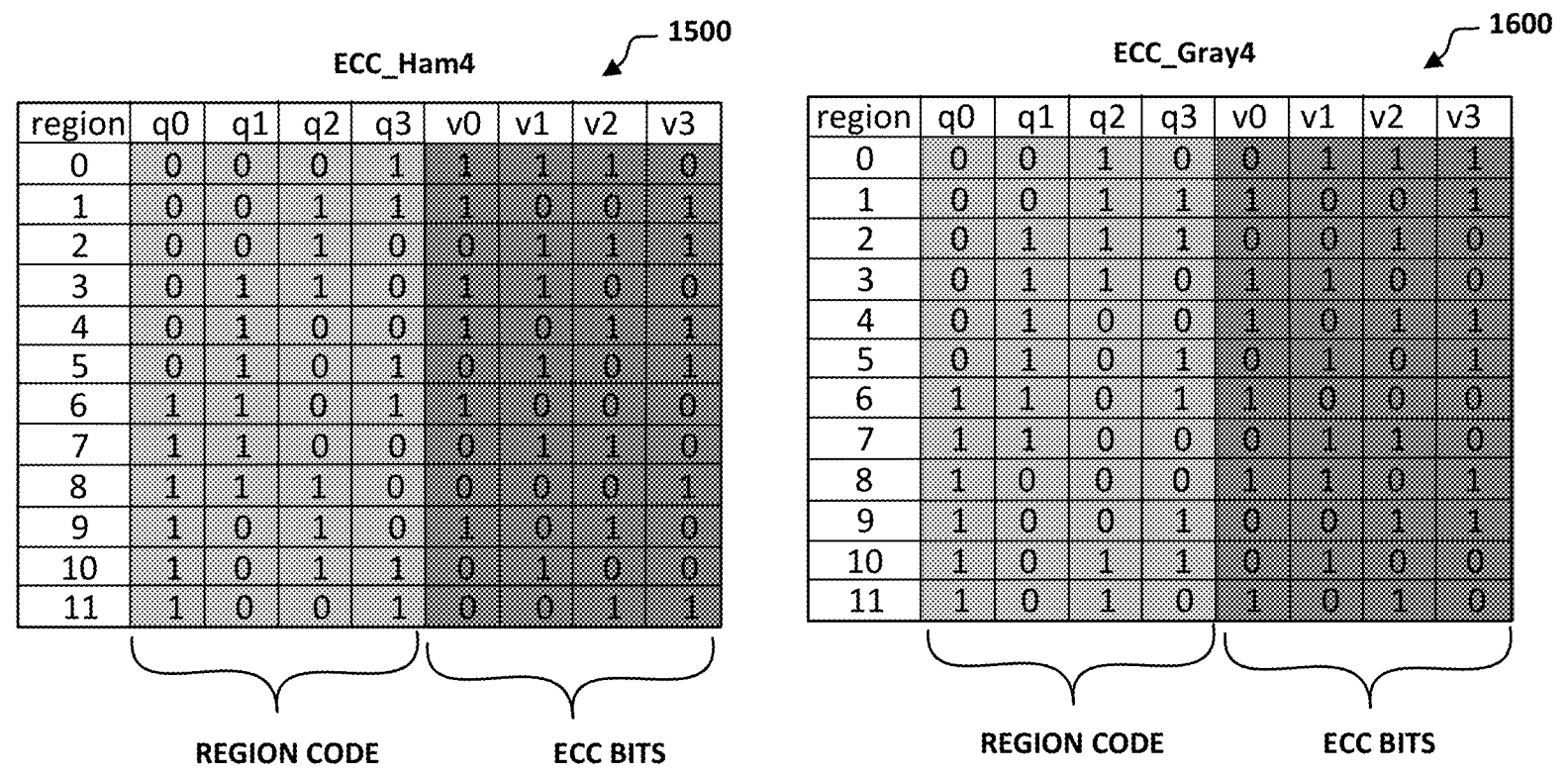

FIG. 15 is a diagram illustrating an array 1500 of codewords with corresponding to Ham4 ECC bits including region code bits and ECC bits, in accordance with various aspects of the present disclosure. The region codes q0, q1, q2, and q3 are threshold bits that are output by the processing circuitry and correspond to the first set of exposure control signals 1202-1208 described in FIG. 12. For example, as illustrated in FIG. 15, q1 is 000111111000 that corresponds to the second exposure control signal 1204 in FIG. 12.

The ECC bits v0, v1, v2, and v3 are threshold bits that are output by the processing circuitry and correspond to the second set of exposure control signals 1210-1216 described in FIG. 12. For example, as illustrated in FIG. 15, v1 is 101101010010 that corresponds to the sixth exposure control signal 1212 in FIG. 12.

FIG. 16 is a diagram illustrating an array 1600 of codewords with corresponding to Gray4 ECC including region code bits and ECC bits, in accordance with various aspects of the present disclosure. The region codes q0, q1, q2, and q3 are threshold bits that are output by the processing circuitry and correspond to the first set of exposure control signals 1302-1308 described in FIG. 13. For example, as illustrated in FIG. 16, q1 is 001111110000 that corresponds to the second exposure control signal 1304 in FIG. 13.

The ECC bits v0, v1, v2, and v3 are threshold bits that are output by the processing circuitry and correspond to the second set of exposure control signals 1310-1316 described in FIG. 13. For example, as illustrated in FIG. 16, v10 is 100101011010 that corresponds to the sixth exposure control signal 1312 in FIG. 13.

Figure 17:
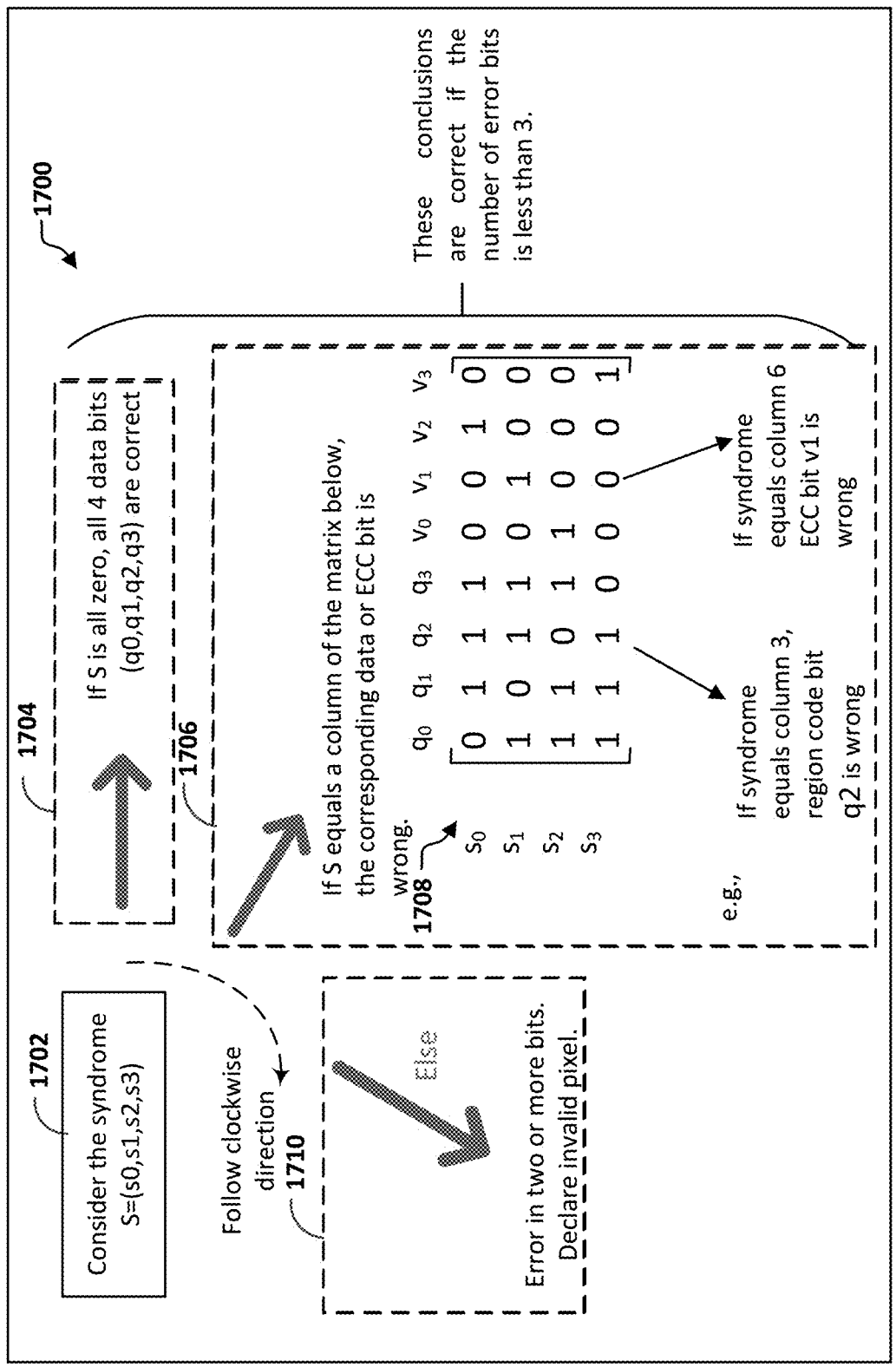
FIG. 17 is a flow diagram illustrating an ECC decoding process for determining a region code, in accordance with various aspects of the present disclosure.

FIG. 17 is a flow diagram illustrating an ECC decoding process 1700 for determining a region code, in accordance with various aspects of the present disclosure. The process 1700 includes the processing circuitry (e.g., the controller 113) considering a syndrome S (s0, s1, s2, and s3) with respect to the threshold bits q0, q1, q2, q3, v0, v1, v2, and v3 (at block 1702). The syndrome S is calculated by the processing circuitry with a matrix multiplication illustrated in Expression (4) below.

$$S = \begin{bmatrix} s0 \\ s1 \\ s2 \\ s3 \end{bmatrix} = \begin{bmatrix} 0 & 1 & 1 & 1 & 0 & 0 & 1 & 0 \\ 1 & 0 & 1 & 1 & 0 & 1 & 0 & 0 \\ 1 & 1 & 0 & 1 & 1 & 0 & 0 & 0 \\ 1 & 1 & 1 & 0 & 0 & 0 & 0 & 1 \end{bmatrix} \begin{bmatrix} q0 \\ q1 \\ \vdots \\ v2 \\ v3 \end{bmatrix} \quad (4)$$

The calculations in Expression (4) are performed on bits with a modulo 2 calculation. Consequently, the operations are equivalent to exclusive-OR operations. From Expression (4), $s0 = 0*q0+1*q1+1*q2+1*q3+0*v0+0*v1+1*v2+0*v3$
(modulo 2)=$q1$ XOR $q2$ XOR $q3$ XOR $v2$.

When the error bits are less than three bits, the process 1700 includes the processing circuitry determining whether s0, s1, s2, and s3 of the syndrome S are all zero (at block 1704). When determining that s0, s1, s2, and s3 of the syndrome S are all zero, the processing circuitry determines that the region code (i.e., threshold bits q0, q1, q2, and q3) is correct.

When the error bits are less than three bits, the process 1700 includes the processing circuitry determining whether s0, s1, s2, and s3 of the syndrome S are equal to a column in the matrix 1708 shown in FIG. 17 to determine whether one of the threshold bits q0, q1, q2, q3, v0, v1, v2, and v3 is incorrect (at block 1706). For example, when determining that s0, s1, s2, and s3 of the syndrome S are equal to column 3 (i.e., 1101), the processing circuitry determines that the threshold bit q2 is incorrect. Alternatively, when determining that s0, s1, s2, and s3 of the syndrome S are equal to column 6 (i.e., 0100), the processing circuitry determines that the threshold ECC bit v1 is incorrect.

Lastly, the process 1700 includes the processing circuitry determining whether there is an error in two or more bits (at block 1710). When determining that there is an error two or more bits, the processing circuitry declares the given pixel an invalid pixel.

Figure 18:
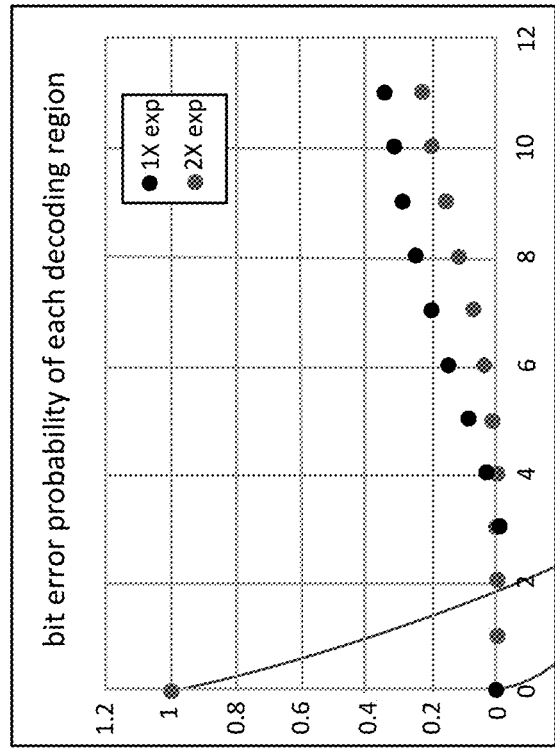
FIG. 18 is a chart illustrating approximate decoding error based on a particular bit error.

FIG. 18 is a chart illustrating approximate decoding error based on a particular bit error. As illustrated in FIG. 18, the chart 1800 includes a region column 1802, a code column 1804, an error column 1806, a code error column 1808, a decoded region column 1810, and an approximate decoding error column 1812.

The region column 1802 includes five different examples of region 0. The code column 1805 includes five different examples where the true region is region 0 (which is 0001 in Ham4). The error column 1806 includes five different examples of an error status of the region code for the region 0: 1) no bit error, 2) b0 is wrong, 3) b1 is wrong, 4) b2 is wrong, and 5) b3 is wrong.

The code error column 1808 includes five different examples of the region code in the code column 1804 with respect to the error column 1806: 1) region code is 0001 because there is no bit error, 2) region code is 1001 because b0 is wrong, 3) region code is 0101 because b1 is wrong, 4) region code is 0011 because b2 is wrong, 5) region code is 0000 because b3 is wrong.

The decoded region column 1810 includes five different examples of a decoded region from the region code in the code error column 1808: 1) region 0, 2) region 11, 3) region 5, 4) region 1, and 5) invalid.

Lastly, the approximate decoding error column 1812 includes five different examples of an approximate decoding error with respect to the decoded region column 1810: 1) $0.024*d_{max}$, 2) $0.917*d_{max}$, 3) $0.417*d_{max}$, 4) $0.083*d_{max}$, and 5) invalid. As illustrated in FIG. 18, a single bit error (e.g., bit b0) in the region code may result in an object located in region 0 being interpreted as being located in region 11, which is a significant error. Consequently, the decoded distance error is much larger when the region code is incorrectly determined.

Figure 19:
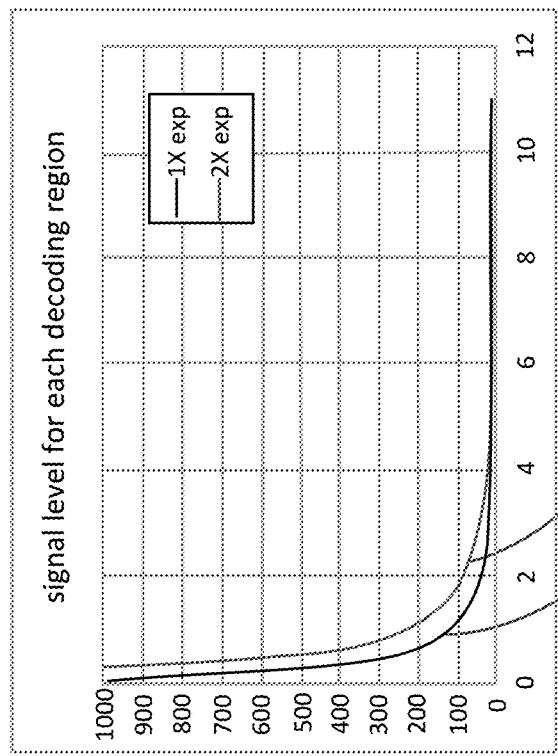
FIG. 19 is a chart illustrating a ToF sensor signal level across decoding regions for two different exposure times.

While ECC is one way to correct an incorrect region, another way to reduce the likelihood of an incorrect region is to double the exposure time. FIG. 19 is a chart illustrating a ToF sensor signal level across decoding regions for two different exposure times. Specifically, 1× exposure 1902 (1× exp in graph) is set to just below saturation at region 0, and 2× exposure 1904 (2× exp in graph) is set to two times as long as 1× exposure 1902. As illustrated in FIG. 19, the ToF sensor signal level is 1000 in region 0 for both 1× exposure 1902 and 2× exposure 1904. However, there is no signal saturation for the 1× exposure, whereas the 2× exposure 1904 is saturated in region 0.

At region 1, the ToF sensor signal level drops to 100 for the 1× exposure 1902 and 200 for the 2× exposure 1904. At region 2, the ToF sensor signal level drops to 50 for the 1× exposure 1902 and 100 for the 2× exposure 1904. At region 3, the ToF sensor signal level drops to 25 for the 1× exposure 1902 and 50 for the 2× exposure 1904. At regions 4-11, the ToF sensor signal continues to drop by half from one region to another for the 1× exposure 1902 and 50 for the 2× exposure 1904.

Figure 20:
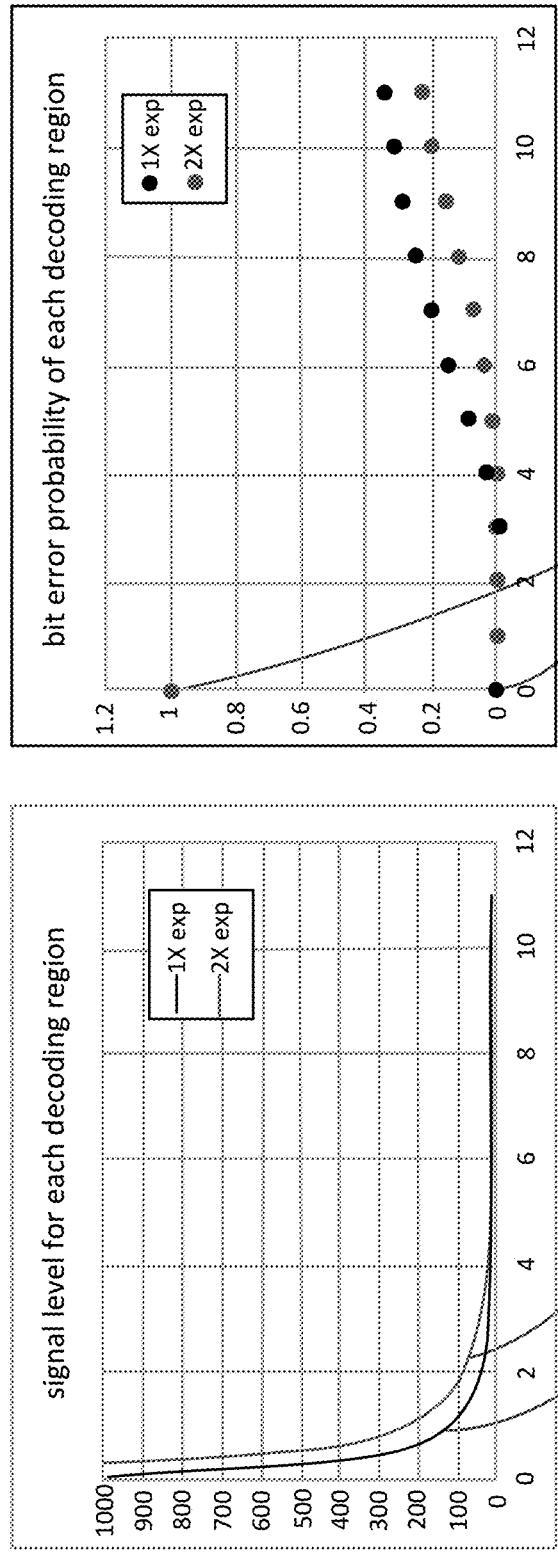
FIG. 20 is a chart illustrating a bit error probability of each decoding region for two different exposure times.

FIG. 20 is a chart illustrating a bit error probability of each decoding region for two different exposure times. Specifically, 1× exposure 2002 and 2× exposure 2004. As illustrated in FIG. 20, the bit error probability of the 2× exposure 2004 is 100% at region 0 because of the oversaturation of the 2× exposure 2004 at region 0.

Figure 21:
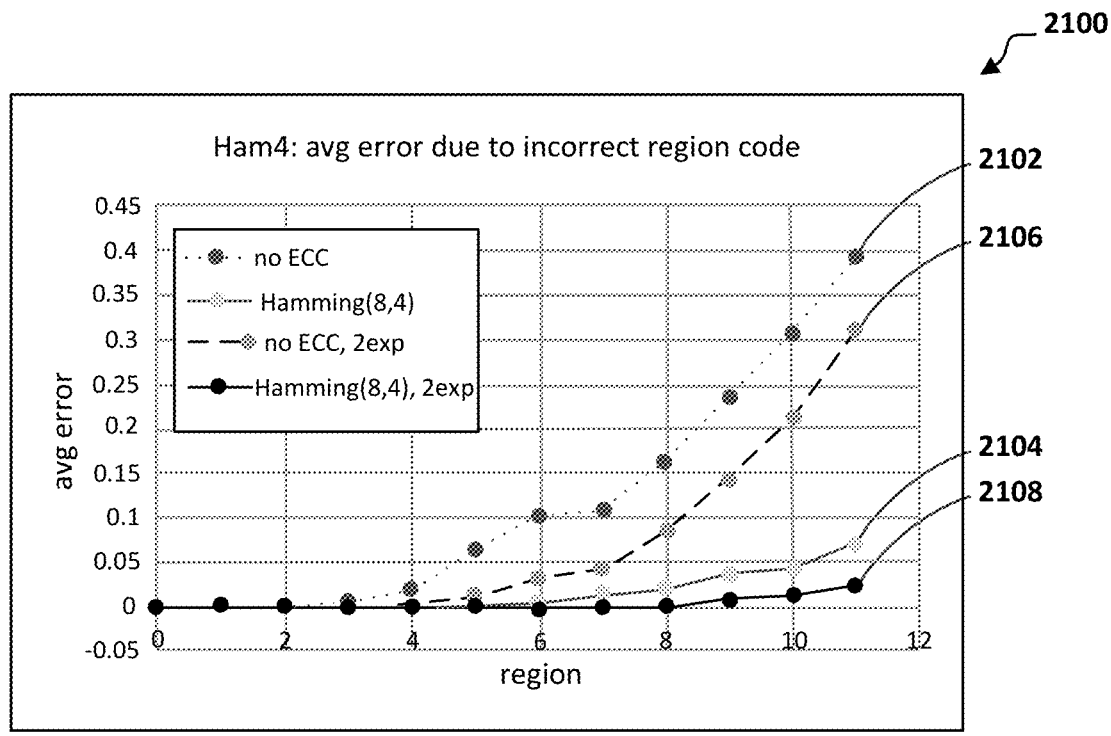
FIG. 21 is a chart illustrating an average error due to incorrect region code with Ham4 ECC bits, in accordance with various aspects of the present disclosure.

FIG. 21 is a chart illustrating an average error due to incorrect region code with Ham4 ECC bits, in accordance with various aspects of the present disclosure. As illustrated in FIG. 21, the chart 2100 includes an average error with no ECC 2102, an average error with Hamming (8,4) 2104, an average error with no ECC and 2× exposure 2106, and an average error with Hamming (8,4) and 2× exposure 2108.

As illustrated in FIG. 21, at regions 0-3, the average error is approximately 0% for the no ECC 2102, approximately 0% for the Hamming (8,4) 2104, approximately 0% for no ECC and 2× exposure 2106, and approximately 0% for Hamming (8,4) and 2× exposure 2108.

Further, as illustrated in FIG. 21, at region 4, the average error is approximately 2.5% for the no ECC 2102, approximately 0% for the Hamming (8,4) 2104, approximately 0% for no ECC and 2× exposure 2106, and approximately 0% for Hamming (8,4) and 2× exposure 2108.

Additionally, as illustrated in FIG. 21, at region 8, the average error is approximately 17% for the no ECC 2102, approximately 2.5% for the Hamming (8,4) 2104, approximately 8% for no ECC and 2× exposure 2106, and approximately 0% for Hamming (8,4) and 2× exposure 2108.

Lastly, as illustrated in FIG. 21, at region 11, the average error is approximately 38% for the no ECC 2102, approximately 6% for the Hamming (8,4) 2104, approximately 32% for no ECC and 2× exposure 2106, and approximately 2.5% for Hamming (8,4) and 2× exposure 2108.

Figure 22:
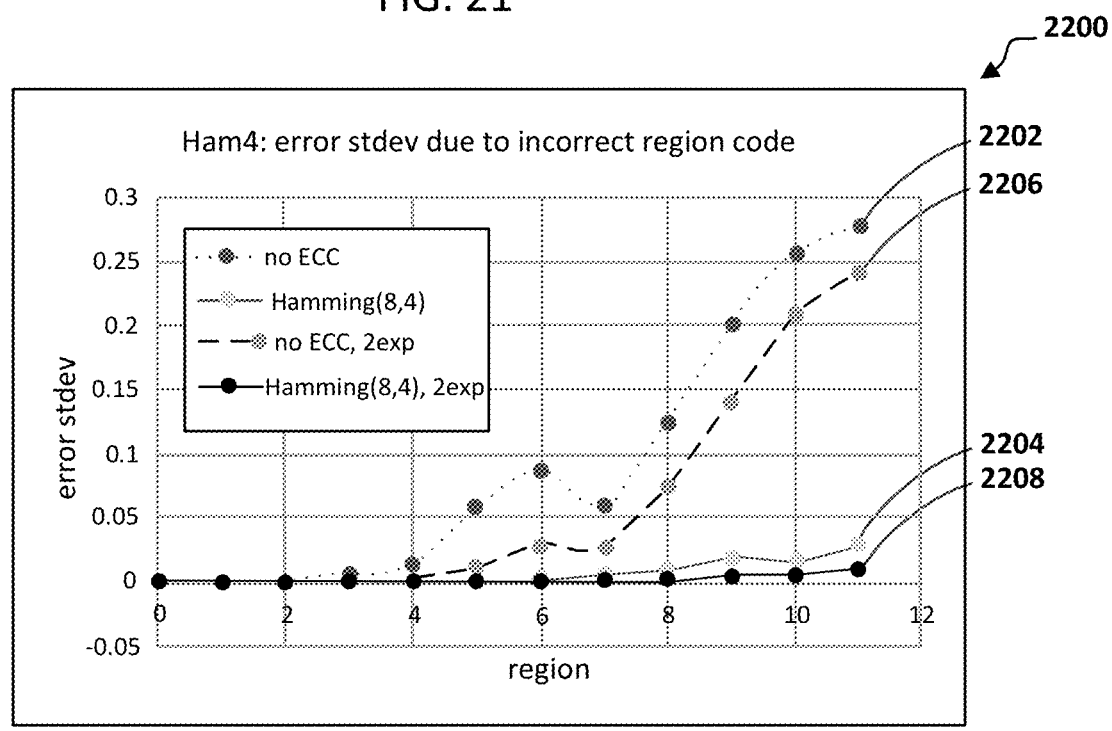
FIG. 22 is a chart illustrating a standard deviation error due to incorrect region code with Ham4 ECC bits, in accordance with various aspects of the present disclosure.

FIG. 22 is a chart illustrating a standard deviation error due to incorrect region code with Ham4 ECC bits, in accordance with various aspects of the present disclosure. As illustrated in FIG. 22, the chart 2200 includes a standard deviation error with no ECC 2202, a standard deviation error with Hamming (8,4) 2204, a standard deviation error with no ECC and 2× exposure 2206, and a standard deviation error with Hamming (8,4) and 2× exposure 2208.

As illustrated in FIG. 22, at regions 0-3, the standard deviation error is approximately 0% for the no ECC 2202, approximately 0% for the Hamming (8,4) 2204, approximately 0% for no ECC and 2× exposure 2206, and approximately 0% for Hamming (8,4) and 2× exposure 2208.

Further, as illustrated in FIG. 22, at region 4, the standard deviation error is approximately 2.5% for the no ECC 2202, approximately 0% for the Hamming (8,4) 2204, approximately 0% for no ECC and 2× exposure 2206, and approximately 0% for Hamming (8,4) and 2× exposure 2208.

Additionally, as illustrated in FIG. 22, at region 8, the standard deviation error is approximately 13% for the no ECC 2202, approximately 2.5% for the Hamming (8,4) 2204, approximately 7.5% for no ECC and 2× exposure 2206, and approximately 0% for Hamming (8,4) and 2× exposure 2208.

Lastly, as illustrated in FIG. 22, at region 11, the standard deviation error is approximately 27.5% for the no ECC 2202, approximately 2.5% for the Hamming (8,4) 2204, approximately 24% for no ECC and 2× exposure 2206, and approximately 1% for Hamming (8,4) and 2× exposure 2208.

Figure 23:
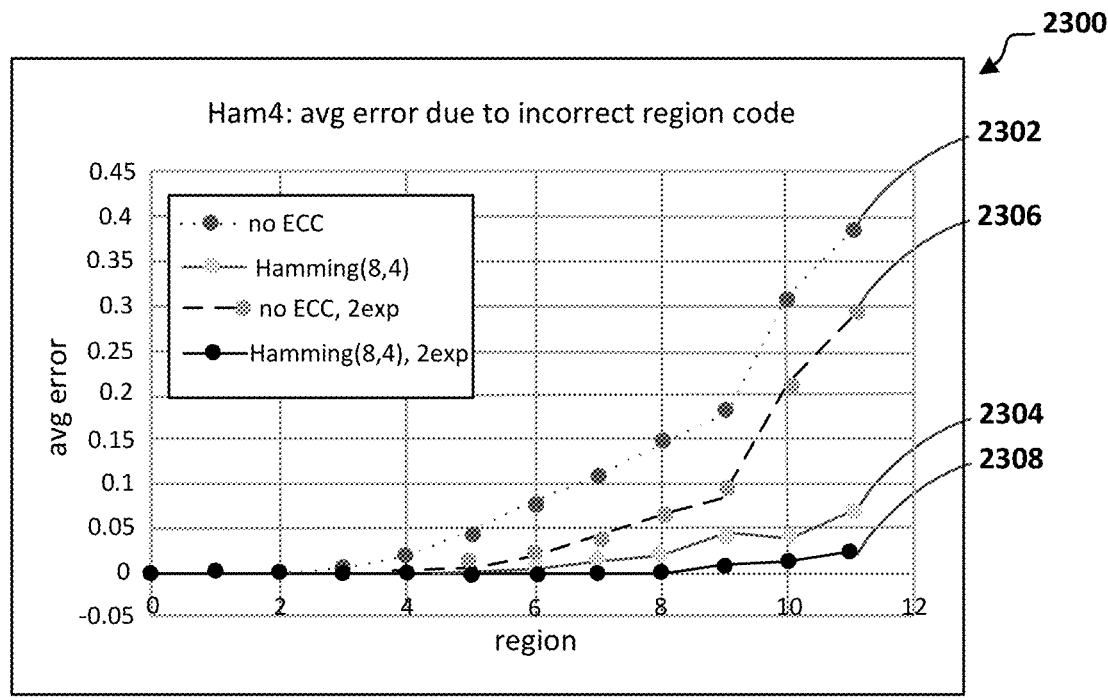
FIG. 23 is a chart illustrating an average error due to incorrect region code with Gray4 ECC bits, in accordance with various aspects of the present disclosure.

FIG. 23 is a chart illustrating an average error due to incorrect region code with Gray4 ECC bits, in accordance with various aspects of the present disclosure. As illustrated in FIG. 23, the chart 2300 includes an average error with no ECC 2302, an average error with Hamming (8,4) 2304, an average error with no ECC and 2× exposure 2306, and an average error with Hamming (8,4) and 2× exposure 2308.

As illustrated in FIG. 23, at regions 0-3, the average error is approximately 0% for the no ECC 2302, approximately 0% for the Hamming (8,4) 2304, approximately 0% for no ECC and 2× exposure 2306, and approximately 0% for Hamming (8,4) and 2× exposure 2308.

Further, as illustrated in FIG. 23, at region 4, the average error is approximately 2.5% for the no ECC 2302, approximately 0% for the Hamming (8,4) 2304, approximately 0% for no ECC and 2× exposure 2306, and approximately 0% for Hamming (8,4) and 2× exposure 2308.

Additionally, as illustrated in FIG. 23, at region 8, the average error is approximately 15% for the no ECC 2302, approximately 2.5% for the Hamming (8,4) 2304, approximately 7.5% for no ECC and 2× exposure 2306, and approximately 0% for Hamming (8,4) and 2× exposure 2308.

Lastly, as illustrated in FIG. 23, at region 11, the average error is approximately 38% for the no ECC 2302, approximately 4% for the Hamming (8,4) 2304, approximately 29% for no ECC and 2× exposure 2306, and approximately 1% for Hamming (8,4) and 2× exposure 2308.

Figure 24:
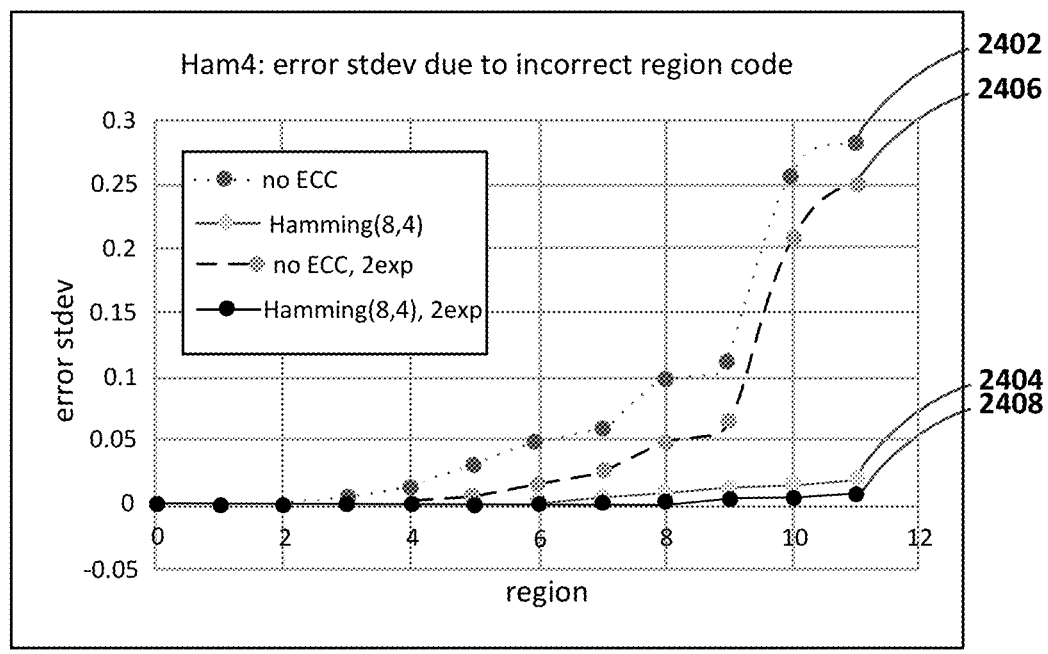
FIG. 24 is a chart illustrating a standard deviation error due to incorrect region code with Gray4 ECC bits, in accordance with various aspects of the present disclosure.

FIG. 24 is a chart illustrating a standard deviation error due to incorrect region code with Gray4 ECC bits, in accordance with various aspects of the present disclosure. As illustrated in FIG. 24, the chart 2400 includes a standard deviation error with no ECC 2402, a standard deviation error with Hamming (8,4) 2404, a standard deviation error with no ECC and 2× exposure 2406, and a standard deviation error with Hamming (8,4) and 2× exposure 2408.

As illustrated in FIG. 24, at regions 0-3, the standard deviation error is approximately 0% for the no ECC 2402, approximately 0% for the Hamming (8,4) 2404, approximately 0% for no ECC and 2× exposure 2406, and approximately 0% for Hamming (8,4) and 2× exposure 2408.

Further, as illustrated in FIG. 24, at region 4, the standard deviation error is approximately 2.5% for the no ECC 2402, approximately 0% for the Hamming (8,4) 2404, approximately 0% for no ECC and 2× exposure 2406, and approximately 0% for Hamming (8,4) and 2× exposure 2408.

Additionally, as illustrated in FIG. 24, at region 8, the standard deviation error is approximately 10% for the no ECC 2402, approximately 1% for the Hamming (8,4) 2404, approximately 5% for no ECC and 2× exposure 2406, and approximately 0% for Hamming (8,4) and 2× exposure 2408.

Lastly, as illustrated in FIG. 24, at region 11, the standard deviation error is approximately 28% for the no ECC 2402, approximately 2.5% for the Hamming (8,4) 2404, approximately 25% for no ECC and 2× exposure 2406, and approximately 1% for Hamming (8,4) and 2× exposure 2408.

As illustrated in FIGS. 21-24, the average error and standard deviation error is significantly lower with the Hamming (8,4) using Ham4 or Gray4 ECC bits than no ECC. Moreover, Hamming (8,4) 1× exposure is not significantly different from Hamming (8,4) 2× exposure and Hamming (8,4) 2× exposure is oversaturated at region 8 as explained above.

[Conclusion]

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than the examples provided would be apparent upon reading the above description. The scope should be determined, not with reference to the above description, but should instead be determined with reference to the appended claims, along with the full scope of equivalents to which the claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A Time-of-Flight (ToF) sensor comprising:
   an array of pixels; and
   processing circuitry configured to
   generate a plurality of ToF exposure control signals that control at least one pixel of the array of pixels to generate a plurality of ToF pixel signals,
   generate a plurality of error correcting code (ECC) exposure control signals that control the at least one pixel to generate a plurality of ECC pixel signals, and
   determine a distance from an object based on the plurality of ToF pixel signals and the plurality of ECC pixel signals.

2. The ToF sensor according to claim 1, wherein, to determine the distance from the object based on the plurality of ToF pixel signals and the plurality of ECC pixel signals, the processing circuitry is further configured to
   generate a plurality of threshold bits by thresholding on the plurality of ToF pixel signals and the plurality of ECC pixel signals, the plurality of threshold bits including ToF bits and ECC bits,
   determine a region code from the plurality of threshold bits with the ToF bits and the ECC bits, and
   calculate the distance based on the plurality of ToF pixel signals and the region code.

3. The ToF sensor according to claim 2, wherein the ECC bits are Ham4 ECC bits, and wherein, to determine the region code from the plurality of threshold bits with the ECC bits, the processing circuitry is further configured to perform Hamming (8,4) decoding with the Ham4 ECC bits to detect and correct a bit error in the plurality of threshold bits.

4. The ToF sensor according to claim 2, wherein the ECC bits are Gray4 ECC bits, and wherein, to determine the region code from the plurality of threshold bits with the ECC bits, the processing circuitry is further configured perform Hamming (8,4) decoding with the Gray4 ECC bits to detect and correct a bit error in the plurality of threshold bits.

5. The ToF sensor according to claim 2, wherein, to perform Hamming (8,4) decoding with the ToF bits and the ECC bits to detect and correct the bit error in the plurality of threshold bits, the processing circuitry is further configured to
   determine a syndrome,
   determine whether the syndrome is all zeroes,
   determine that the bit error does not exist in the plurality of threshold bits in response to determining that the syndrome is all zeroes.

6. The ToF sensor according to claim 5, wherein, to perform Hamming (8,4) decoding with the ToF bits and the ECC bits to detect and correct the bit error in the plurality of threshold bits, the processing circuitry is further configured to
   determine whether the syndrome matches one column in a matrix in response to determining that the syndrome is not all zeroes, and
   detect the bit error in the plurality of threshold bits in response to determining that the syndrome matches the one column in the matrix, the one column being associated with one threshold bit in the plurality of threshold bits, and wherein the one threshold bit is the bit error.

7. The ToF sensor according to claim 2, wherein the processing circuitry is further configured to
   detect two or more bit errors in the plurality of threshold bits, and
   declare the at least one pixel as an invalid pixel in response to detecting the two or more bit errors in the plurality of threshold bits.

8. A method comprising:
   generating, with processing circuitry, a plurality of ToF exposure control signals that control at least one pixel of an array of pixels to generate a plurality of ToF pixel signals;

generating, with the processing circuitry, a plurality of error correcting code (ECC) exposure control signals that control the at least one pixel to generate a plurality of ECC pixel signals; and determining, with the processing circuitry, a distance from an object based on the plurality of ToF pixel signals and the plurality of ECC pixel signals.

9. The method according to claim 8, wherein determining the distance from the object based on the plurality of ToF pixel signals and the plurality of ECC pixel signals further includes generating a plurality of threshold bits by thresholding on the plurality of ToF pixel signals and the plurality of ECC pixel signals, the plurality of threshold bits including ECC bits, determining a region code from the plurality of threshold bits with the ECC bits, and calculating the distance based on the plurality of ToF pixel signals and the region code.

10. The method according to claim 9, wherein the ECC bits are Ham4 ECC bits, and wherein determining the region code from the plurality of threshold bits with the ECC bits further includes performing Hamming (8,4) decoding with the Ham4 ECC bits to detect and correct a bit error in the plurality of threshold bits.

11. The method according to claim 9, wherein the ECC bits are Gray4 ECC bits, and wherein determining the region code from the plurality of threshold bits with the ECC bits further includes performing Hamming (8,4) decoding with the Gray4 ECC bits to detect and correct a bit error in the plurality of threshold bits.

12. The method according to claim 9, wherein performing Hamming (8,4) decoding with the ToF bits and the ECC bits to detect and correct the bit error in the plurality of threshold bits further includes determining a syndrome, determining whether the syndrome is all zeroes, and determining that the bit error does not exist in the plurality of threshold bits in response to determining that the syndrome is all zeroes.

13. The method according to claim 12, wherein performing Hamming (8,4) decoding with the ToF bits and the ECC bits to detect and correct the bit error in the plurality of threshold bits further includes determining whether the syndrome matches one column in a matrix in response to determining that the syndrome is not all zeroes, and detecting the bit error in the plurality of threshold bits in response to determining that the syndrome matches the one column in the matrix, the one column being associated with one threshold bit in the plurality of threshold bits, and wherein the one threshold bit is the bit error.

14. The method according to claim 9, further comprising:

detecting two or more bit errors in the plurality of threshold bits; and declaring the at least one pixel as an invalid pixel in response to detecting the two or more bit errors in the plurality of threshold bits.

15. A non-transitory computer-readable medium comprising instructions that, when executed by an electronic processor, cause the electronic processor to perform a set of operations comprising:

generating a plurality of ToF exposure control signals that control at least one pixel of an array of pixels to generate a plurality of ToF pixel signals, generating a plurality of error correcting code (ECC) exposure control signals that control the at least one pixel to generate a plurality of ECC pixel signals; and determining a distance from an object based on the plurality of ToF pixel signals and the plurality of ECC pixel signals.

16. The non-transitory computer-readable medium according to claim 15, wherein determining the distance from the object based on the plurality of ToF pixel signals and the plurality of ECC pixel signals further includes generating a plurality of threshold bits by thresholding on the plurality of ToF pixel signals and the plurality of ECC pixel signals, the plurality of threshold bits including ECC bits, determining a region code from the plurality of threshold bits with the ECC bits, and calculating the distance based on the plurality of ToF pixel signals and the region code.

17. The non-transitory computer-readable medium according to claim 16, wherein the ECC bits are Ham4 ECC bits, and wherein determining the region code from the plurality of threshold bits with the ECC bits further includes performing Hamming (8,4) decoding with the Ham4 ECC bits to detect and correct a bit error in the plurality of threshold bits.

18. The non-transitory computer-readable medium according to claim 16, wherein the ECC bits are Gray4 ECC bits, and wherein determining the region code from the plurality of threshold bits with the ECC bits further includes performing Hamming (8,4) decoding with the Gray4 ECC bits to detect and correct a bit error in the plurality of threshold bits.

19. The non-transitory computer-readable medium according to claim 16, wherein performing the Hamming (8,4) decoding with the ToF bits and the ECC bits to detect and correct the bit error in the plurality of threshold bits further includes determining a syndrome, determining whether the syndrome is all zeroes, and determining that the bit error does not exist in the plurality of threshold bits in response to determining that the syndrome is all zeroes.

20. The non-transitory computer-readable medium according to claim 19, wherein performing the Hamming (8,4) decoding with the ToF bits and the ECC bits to detect and correct the bit error in the plurality of threshold bits further includes determining whether the syndrome matches one column in a matrix in response to determining that the syndrome is not all zeroes, and detecting the bit error in the plurality of threshold bits in response to determining that the syndrome matches the one column in the matrix, the one column being associated with one threshold bit in the plurality of threshold bits, and wherein the one threshold bit is the bit error.

* * * * *